US 8,313,281 B2

(12) United States Patent
Rickert

(10) Patent No.: US 8,313,281 B2
(45) Date of Patent: Nov. 20, 2012

(54) TANDEM SEAL ARRANGEMENT WITH REVERSE FLOW SECONDARY SEAL

(75) Inventor: Ronald P. Rickert, Arvada, CO (US)

(73) Assignee: Sundyne Corporation, Arvada, CO (US)

( * ) Notice: Subject to any disclaimer, the term of this patent is extended or adjusted under 35 U.S.C. 154(b) by 624 days.

(21) Appl. No.: 12/480,608

(22) Filed: Jun. 8, 2009

(65) Prior Publication Data

US 2010/0310354 A1 Dec. 9, 2010

(51) Int. Cl.
F04D 27/02 (2006.01)
F04D 29/08 (2006.01)
F01D 11/00 (2006.01)
F03B 11/00 (2006.01)
F03D 11/00 (2006.01)
F16J 15/00 (2006.01)

(52) U.S. Cl. .......................... 415/1; 415/112; 415/168.2

(58) Field of Classification Search .................. 415/112, 415/111, 110, 168.2, 206, 1
See application file for complete search history.

(56) References Cited

U.S. PATENT DOCUMENTS

| 4,477,223 | A | * | 10/1984 | Giroux ........................ 415/168.2 |
| 5,529,315 | A | * | 6/1996 | Borrino et al. ................ 277/352 |
| 5,713,576 | A | * | 2/1998 | Wasser et al. ................ 277/304 |
| 5,722,671 | A | * | 3/1998 | Nosowicz et al. ............ 277/408 |
| 5,762,342 | A | | 6/1998 | Kakabaker et al. |
| 5,901,965 | A | * | 5/1999 | Ringer et al. ................ 277/369 |
| 5,927,722 | A | | 7/1999 | Carmody et al. |
| 5,941,532 | A | | 8/1999 | Flaherty et al. |
| 6,073,934 | A | | 6/2000 | Fondelius |
| 6,076,830 | A | | 6/2000 | Wu et al. |
| 6,109,617 | A | | 8/2000 | Laney |
| 6,152,452 | A | | 11/2000 | Wang |
| 6,155,572 | A | | 12/2000 | Wu et al. |
| 6,200,086 | B1 | * | 3/2001 | O'Shea ........................ 415/111 |
| 6,257,589 | B1 | | 7/2001 | Flaherty et al. |
| 6,343,496 | B1 | | 2/2002 | Hanna et al. |
| 6,349,946 | B1 | | 2/2002 | Daugherty |
| 6,386,547 | B2 | | 5/2002 | Wu et al. |
| 6,412,784 | B1 | | 7/2002 | Cohen |
| 6,446,976 | B1 | | 9/2002 | Key et al. |
| 6,454,268 | B1 | | 9/2002 | Muraki |
| 6,623,238 | B2 | | 9/2003 | Langston et al. |
| 6,681,579 | B2 | | 1/2004 | Lane et al. |
| 6,685,192 | B2 | | 2/2004 | Takigahira et al. |
| 6,726,213 | B2 | | 4/2004 | Wang |
| 6,789,804 | B2 | | 9/2004 | Wilhelm |

(Continued)

FOREIGN PATENT DOCUMENTS

CN 1499108 A 5/2004

(Continued)

OTHER PUBLICATIONS

Examiner's first report, Austrian patent application 2010202352, dated Feb. 14, 2011.

(Continued)

Primary Examiner — Christopher Verdier
Assistant Examiner — Su Htay
(74) Attorney, Agent, or Firm — Carlson, Gaskey & Olds, P.C.

(57) ABSTRACT

A process fluid communication system includes a fluid source in communication with a process seal and a gearbox seal to communicate a pumping medium into a turbomachinery housing and a gearbox housing through the process seal and the gearbox seal.

4 Claims, 2 Drawing Sheets

U.S. PATENT DOCUMENTS

| | | |
|---|---|---|
| 6,811,155 B2 | 11/2004 | Takahashi |
| 6,845,985 B2 | 1/2005 | Kraus |
| 6,877,950 B2 | 4/2005 | Liu |
| 6,969,235 B2 | 11/2005 | Feest |
| 6,969,236 B2 | 11/2005 | Giesler et al. |
| 7,014,192 B2 | 3/2006 | Takahashi et al. |
| 7,014,419 B2 | 3/2006 | Farnsworth et al. |
| 7,033,133 B2 | 4/2006 | Bristol et al. |
| 7,033,134 B2 | 4/2006 | Bristol et al. |
| 7,117,961 B2 | 10/2006 | Yong et al. |
| 7,389,832 B2 | 6/2008 | Hooper |
| 7,438,519 B2 | 10/2008 | Torres-Reyes |
| 7,854,587 B2 | 12/2010 | Ito et al. |
| 2006/0275716 A1* | 12/2006 | Marty et al. ............ 431/5 |

FOREIGN PATENT DOCUMENTS

| | | |
|---|---|---|
| JP | 5 78998 | 10/1993 |
| JP | 2007 177887 | 7/2007 |
| WO | 2010129189 | 11/2010 |

OTHER PUBLICATIONS

Office Action for Japanese Application No. 2010-123670, mailed Jun. 5, 2012.

* cited by examiner

TANDEM SEAL ARRANGEMENT WITH REVERSE FLOW SECONDARY SEAL

BACKGROUND

The present disclosure relates to a mechanical seal arrangement, and more particularly to a tandem seal arrangement with reverse flow secondary seal.

Mechanical seal arrangements are used in a wide variety of processes to prevent fluid leakage such as from turbomachinery which is used to transport a process fluid. The turbomachinery often includes a pump or compressor, which includes a shaft driven impeller. The shaft is driven by a motor either directly or indirectly through a gearbox such that the shaft extends from the motor or gearbox to the turbomachinery.

Conventional mechanical seal arrangements, although effective, may permit a very small percentage of lubricant to leak from the gearbox to atmosphere. Tandem process seal arrangements also may permit a very small percentage of process fluid to leak from the turbomachinery to atmosphere (FIG. 1). This may, in some instances, have an environmental impact.

SUMMARY

A process fluid communication system according to an exemplary aspect of the present disclosure includes a fluid source in communication with a process seal and a gearbox seal to communicate a pumping medium into a turbomachinery housing and a gearbox housing through the process seal and the gearbox seal.

A method of reverse pumping for a process fluid communication system according to an exemplary aspect of the present disclosure includes communicating a pumping medium to a process seal and a gearbox seal to communicate the pumping medium into a turbomachinery housing and a gearbox housing through the process seal and the gearbox seal.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
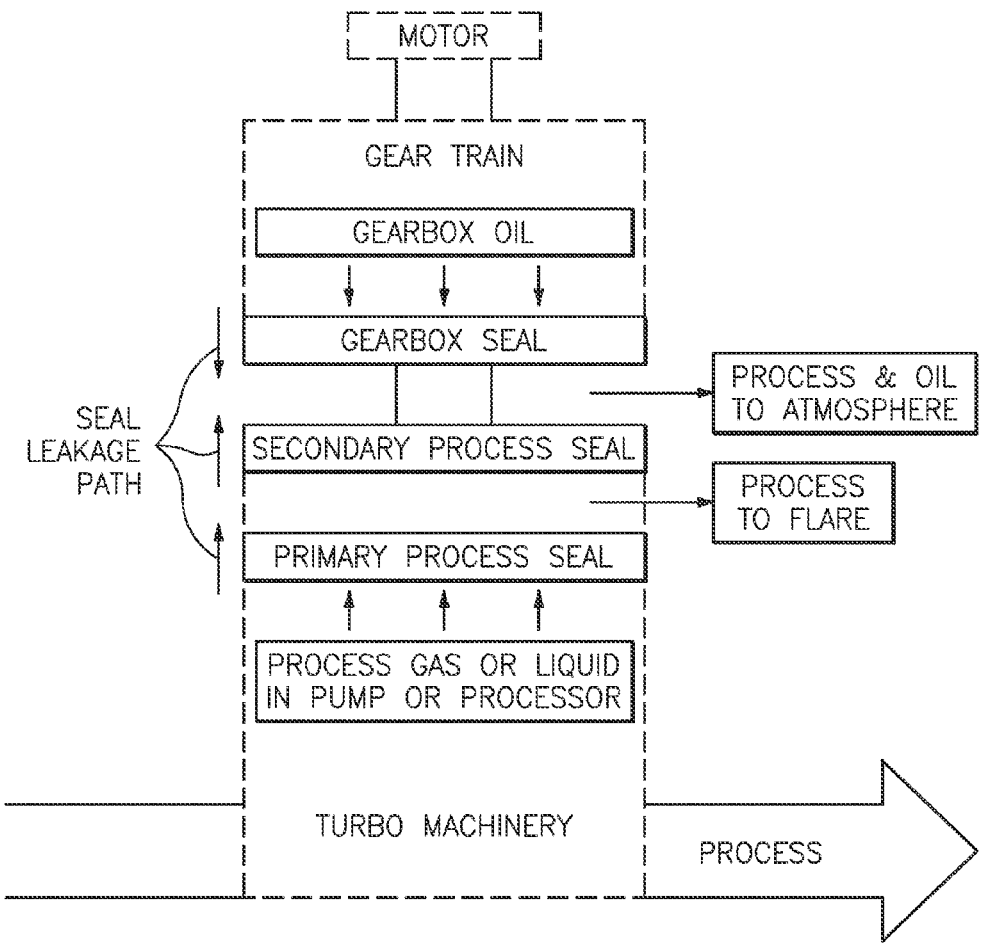
FIG. 1 is a block diagram of a RELATED ART process fluid communication system.
Figure 2:
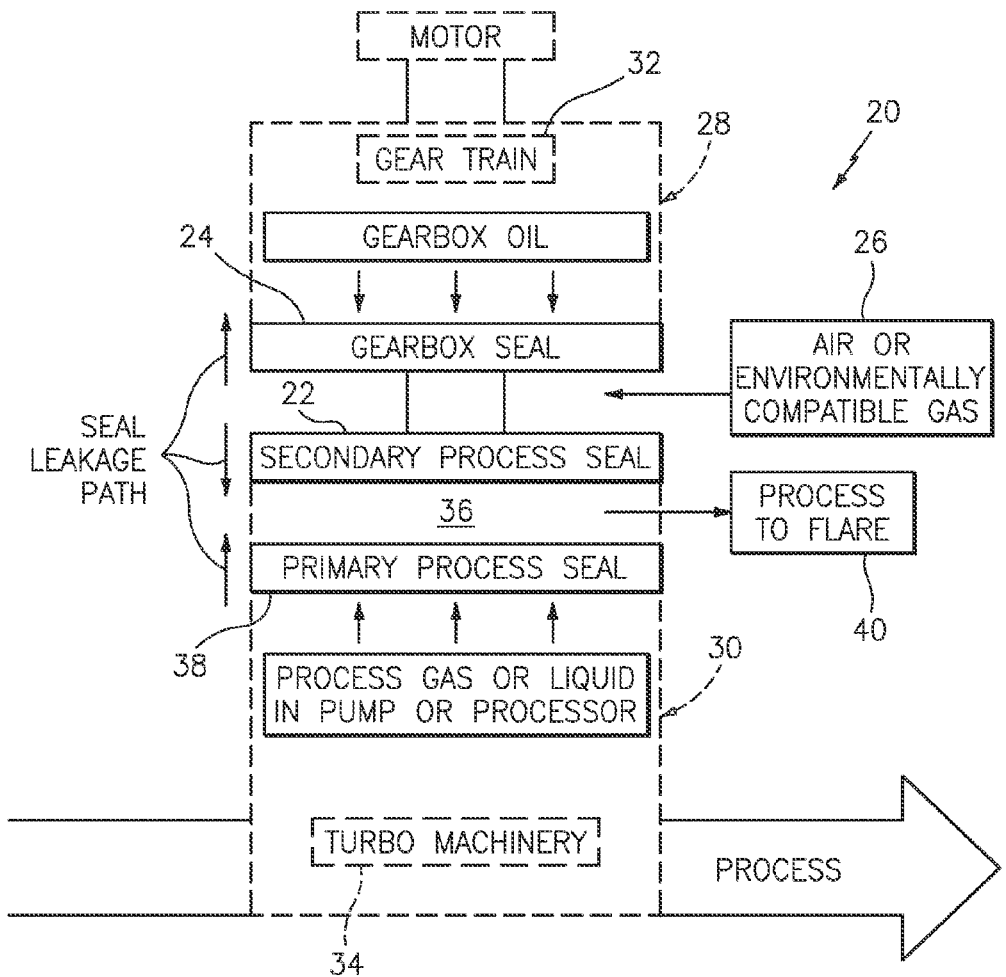
FIG. 2 is a block diagram of a process fluid communication system with a non-contacting reverse pumping seal in accordance with an exemplary embodiment of the present disclosure.

FIG. 2 schematically illustrates a process fluid communication system 20 for a process such as, for example only, hydrocarbons, chemicals, aqueous solutions, etc. The process fluid communication system 20 utilizes reverse pumping action of a secondary process seal 22 and a gearbox seal 24. The secondary process seal 22 and the gearbox seal 24 in the disclosed, non-limiting embodiment may include a Hydropad non-contacting reverse pumping seal manufactured by Rexnord Industries, LLC of Wheeling Ill. USA. The secondary process seal 22 and the gearbox seal 24 receive a film of air or environmentally compatible gas from a fluid source 26 which is communicated through what is otherwise a normal vent area to seal faces in a reverse manner and into the respective gearbox housing 28 and turbomachinery housing 30. The turbomachinery housing 30 includes turbomachinery 34 such as, for example only, a pump or compressor system and turbomachinery vent area 36.

The gearbox seal 24 assures that the gearbox housing 28 which contains a gear train 32 is sealed such that lubricating oil is prevented from being vented to atmosphere. The secondary process seal 22 assures that the turbomachinery housing 30 which contains the turbomachinery 34 is sealed such that the process fluids are prevented from being vented to atmosphere. This provides a significant environmental advantage as all process fluid leakage is essentially returned to a primary vent area 36 between the secondary process seal 22 and a primary process seal 38 such that the process fluid which otherwise may be vented to atmosphere is piped to a flare system 40. Even in the unlikely event of a failure in the primary process seal 38, the secondary process seal 22 still provides containment of any process fluid leakage. It should be noted that in the case where there is a failure of the primary seal, the secondary seal serves as a back-up for the primary seal capable of handling full process pressure.

In one non-limiting embodiment, the fluid source 26 may utilize air as the reverse pumping medium. As such, the system 20 does not even require an external source of a pressurized gas. Alternatively, the fluid source 26 may utilize an environmentally compatible gas as the reverse pumping medium.

The system 20 facilitates retrofit of existing systems as essentially only a single stationary seal comprising the secondary process seal 22 and the gearbox seal 24 need be changed to the reverse pumping seal mentioned previously and the fluid source 26 be communicated to what was heretofore a vent defined by the secondary process seal 22 and the gearbox seal 24. That is, the secondary process seal 22 and the gearbox seal 24 are configured to receive a reverse flow into what was heretofore a vent. It should be understood that reversal of a seal surface within the secondary process seal 22 and the gearbox seal 24 which was in communication with the vent to thereby provide an input port for the fluid source 26 is readily achieved by one of ordinary skill in the art with the benefit of the present disclosure.

The text and figures in the disclosure refer to a tandem seal arrangement used in conjunction with a gearbox seal. This would be the most typical arrangement. However, it should be noted that there is a more general case where the tandem seal arrangement could be used as a stand alone arrangement without a gearbox and its attendant gearbox seal.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of retrofitting a process fluid communication system for reverse pumping comprising:
   reversing a gearbox seal and a primary process seal;
   converting a vent area to a fluid source inlet;
   communicating a pumping medium through a secondary process seal downstream of the primary process seal and the gearbox seal to communicate the pumping medium into a turbomachinery housing and a gearbox housing through the respective secondary process seal and the gearbox seal; and flaring a process fluid from a primary vent area between the secondary process seal and the primary process seal.

2. A method as recited in claim 1, further comprising: communicating an environmentally compatible gas as the pumping medium.

3. A method as recited in claim 1, further comprising: communicating air as the pumping medium.

4. A method as recited in claim 1, further comprising: communicating the pumping medium to the secondary process seal downstream of the primary process seal of a tandem seal arrangement.

* * * * *